United States Patent
Riemhofer et al.

[15] 3,668,275
[45] June 6, 1972

[54] COATING COMPOSITIONS COMPRISING A POLYESTER FROM 1,4-BIS(HYDROXYMETHYL) CYCLOHEXANE

[72] Inventors: Franz Riemhofer; Walter Dittmann; Karl-Heinz Hornung; Ernst-Christian Schutze, all of Marl, Germany

[73] Assignee: Chemische Werke Huels A.G., Marl, Germany

[22] Filed: Aug. 12, 1970

[21] Appl. No.: 63,300

Related U.S. Application Data

[63] Continuation of Ser. No. 749,348, Aug. 1, 1968, abandoned.

[30] Foreign Application Priority Data

Aug. 10, 1967 Germany..............................C 43 079
Feb. 6, 1968 Germany..............................C 44 550

[52] U.S. Cl.....................260/850, 117/132 A, 117/132 BF, 117/161 K, 117/161 LN, 260/31.6, 260/32.8 R, 260/33.4 R, 260/33.6 R, 260/39 R, 260/40 R, 260/75 R, 260/475 P, 260/485 G, 260/834, 260/835
[51] Int. Cl......................................C08g 37/34, C07c 69/34
[58] Field of Search....................260/850, 75, 385; 117/132

[56] References Cited

UNITED STATES PATENTS

| | | |
|---|---|---|
| 2,901,466 | 8/1959 | Kibler et al...............................260/75 |
| 3,049,506 | 8/1962 | Kibler et al...............................260/75 |
| 3,378,402 | 4/1968 | Wiener....................................260/75 |
| 3,390,132 | 6/1968 | Walker....................................260/75 |
| 3,463,742 | 8/1969 | Bell et al..................................260/75 |

FOREIGN PATENTS OR APPLICATIONS

| | | |
|---|---|---|
| 559,963 | 7/1958 | Canada..................................260/850 |
| 586,724 | 11/1959 | Canada..................................260/850 |

*Primary Examiner*—John C. Bleutge
*Attorney*—I. William Millen

[57] ABSTRACT

Coatings having high elasticity and hardness as well as excellent resistance to chemicals from cured compositions of:

(a) aminoplast and (b) linear polyesters of a molecular weight of 600 – 3,000 made from 1,4-bis-(hydroxymethyl)-cyclohexane optionally with minor amounts of other diols, and a mixture of (1) 91–33 mol percent aliphatic dicarboxylic acid, and (2) 9–67 mol percent aromatic and/or cycloaliphatic diacarboxylic acid, functional esterifiable acid derivatives of such acids also being usable.

13 Claims, No Drawings

COATING COMPOSITIONS COMPRISING A POLYESTER FROM 1,4-BIS(HYDROXYMETHYL) CYCLOHEXANE

This application is a continuation of Ser. No. 749,348, filed Aug., 1, 1968, now abandoned.

BACKGROUND OF THE INVENTION

This invention relates to coating compositions comprising:
polymers and/or oligomers containing N-methylol-and/or N-methylol-ether-groups, e.g., aminoplasts; and
linear polyesters containing hydroxyl groups and carboxyl groups.

Many different types of compositions containing aminoplasts and polyesters are well known in the prior art. For example, it is known from German Pat. No. 1,015,165 that coatings can be produced by curing a mixture of a polyester phthalic acid - fumaric acid and propylene glycol, with a butylated melamine-formaldehyde resin. The thus-obtained coatings, however, exhibit a poor chemical resistance.

Conversely, it is also known from German Pat. No. 1,015,165 that coatings having excellent chemical resistance are obtained by combining an alkylated melamine-formaldehyde or urea-formaldehyde condensation product with a linear polyester produced by polyesterification of a dicarboxylic acid with a diol of the general formula:

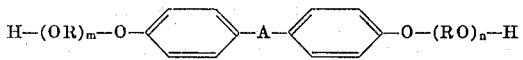

wherein
A represents a 2-alkylidene radical of three–four carbon atoms;
R represents an alkylene radical of two–three carbon atoms; and
$m$ and $n$ are each at least 1, and the total of $m$ and $n$ not being larger than 3.

The thus-obtained coatings, though hard, are very brittle, as will be shown hereinafter in Comparative Example 1.

Furthermore, in U. S. Pat. No. 2,460,186, polyesters of 2-ethyl-hexanediol-1,3 are described as plasticizers of extraordinary value for utilization in urea-formaldehyde or melamine-formaldehyde condensation products. Although coatings obtained on the basis of that United States patent are, in part, flexible and impact-resistant, they are too soft, as will be seen hereinafter in Comparative Examples 2 and 3. Likewise, experiments, wherein mixtures of linear polyesters and a melamine-formaldehyde resin were cured, showed that the thus-obtained coatings, though flexible, were soft (see Comparative Examples 4 and 5).

Thus, coatings having high elasticity, a high degree of hardness and satisfactory resistance to chemicals have not been evident heretofore.

SUMMARY OF THE INVENTION

An object of this invention, therefore, is to provide novel coatings wherein high elasticity is combined with a high degree of hardness.

Another object is to provide novel coating compositions and ingredients for same.

Upon further study of the specification and claims, other objects and advantages of the present invention will become apparent.

To attain the objects of this invention, there is provided a composition comprising:

A. 40 – 10 percent by weight of at least one polymer and/or oligomer containing N-methylol and/or N-methylol-ether-groups; and B. 60 – 90 percent by weight of linear polyesters containing hydroxyl and carboxyl groups, said esters having an average molecular weight of 600 – 3,000 and produced by reacting dihydric alcohol reactant (I) with a dicarboxylic acid reactant (II), wherein said alcohol reactant comprises:

I(1) 70 – 100 molar percent, preferably 80 – 100 molar percent of 1,4-bis-(hydroxymethyl)-cyclohexane; and I(2) 30 – 0 molar percent, preferably 20 – 0 molar percent, of one or more aliphatic or cycloaliphatic diols wherein the hydroxyl functions are separated by two – eight carbon atoms and wherein optionally up to two of said carbon atoms can be substituted by oxygen atoms, said oxygen atoms must be separated by at least two carbon atoms;
and dicarboxylic acid reactant comprises:

II(1) 91 – 33 molar percent, preferably 75 – 50 molar percent, of one or more aromatic or cycloaliphatic dicarboxylic acids and/or functional acid esterifiable derivatives thereof; and II(2). 9 – 67 molar percent, preferably 25 – 50 molar percent, of one or several aliphatic dicarboxylic acids of four – 12 carbon atoms and/or functional acid esterifiable derivatives thereof.

Coatings having especially satisfactory properties are obtained by employing linear polyesters having average molecular weights of 1,000 – 2,500, and generally with the utilization of saturated aliphatic dicarboxylic acids of four – six carbon atoms and/or the derivatives thereof as component II(2) for the preparation of the linear polyesters.

DETAILED DISCUSSION OF THE INVENTION

In the above-mentioned polyesters, the 1,4-bis-(hydroxymethyl)-cyclohexane can be present in its trans- or cis-form, or as a mixture of both forms.

Examples of diols wherein the hydroxyl functions are separated by two – eight carbon atoms and wherein optionally up to two of the carbon atoms can be replaced by oxygen atoms, which must be separated by at least two carbon atoms, include but are not limited to: ethylene glycol, 1,2-propanediol, 1,3-propanediol, 1,2-butanediol, 2,3-butanediol, 1,3-butanediol, 1,4-butanediol, 2,2-diemthyl- 1,3-propanediol, 1,6-hexanediol, 2-ethyl-1,3-hexanediol, 1,2-cyclohexanediol, 1,4-cyclohexanediol, 1,2-bis-(hydroxymethyl)-cyclohexane, 1,3-bis-(hydroxymethyl)-cyclohexane, $x$,8-bis-(hydroxymethyl)-tricyclo[5,2,1,0$^{2,6}$]-decane, wherein $x$ represents 3, 4 or 5, diethylene glycol, triethylene glycol, dipropylene glycol or tripropylene glycol. It is preferred for the aliphatic diols to be hydrocarbon diols of two – four carbon atoms. Cycloaliphatic diols can be employed in their cis- or trans-form, or as a mixture of both forms, and it is preferred that they be cycloalkyl diols of six to 12 carbon atoms.

Examples of aromatic or cycloaliphatic dicarboxylic acids include, but are not limited to: phthalic acid or isophthalic acid, hexahydroterephthalic acid, tetrahydrophthalic acid, hexahydrophthalic acid or hexahydroisophthalic acid, wherein the cycloaliphatic dicarboxylic acids can be employed in their trans- or cis-form, or as a mixture of both forms. It is preferable that the aromatic dicarboxylic acids to hydrocarbon aromatic of six to 12 carbon atoms, and for the cycloaliphatic to be cycloalkyl of six to 12 carbon atoms.

Especially suitable as aliphatic dicarboxylic acids of four – 12 carbon atoms are the saturated hydrocarbon dicarboxylic acids such as succinic acid, glutaric acid, adipic acid, suberic acid, sebacic acid or decanedicarboxylic acid. It is also possible to employ unsaturated dicarboxylic acids, such as, for example, maleic acid, fumaric acid, itaconic acid or citraconic acid; but the use of saturated aliphatic dicarboxylic acids is preferred.

In place of the free dicarboxylic acid, the esters thereof with short-chain alkanols, e.g., dimethyl, diethyl or dipropyl esters, can also be employed. Insofar as the dicarboxylic acids form anhydrides, these can also be utilized, for example, phthalic acid anhydride, hexahydrophthalic acid anhydride, tetrahydrophthalic acid anhydride, succinic acid anhydride, glutaric acid anhydride or maleic acid anhydride. Likewise, other functional acid esterifiable derivatives can also be employed for esterification purposes.

The polyesters can be produced by any conventional process, e.g., with or without a catalyst, with or without passing a stream of inert gas through the reaction mixture, by solution condensation, melt condensation or azeotropic esterification, at temperatures of up to 250° C., or even higher. It is preferred that the thus-liberated water or the thus-liberated alkanols are continuously removed. The esterification takes place almost quantitatively and can be monitored by determining the hydroxyl and acid numbers. The molecular weight can be regulated, for example, by the charging ratio of diol and dicarboxylic acid.

Suitable N-methylol- and/or N-methylol-ether group-containing polymers and/or oligomers are, for example, the conventional reaction products of aldehydes, particularly formaldehyde, with several amino- or amido-group-carrying substances, such as, for example, with melamine, urea, N,N'-ethyleneurea, dicyanodiamide, and benzoguanamine. There can also be used polymers having the structure of copolymerizates into which is polymerized an amide of an α-ethylenically unsaturated carboxylic acid having N-methylol- and/or N-methylol-ether groups, for example, such polymers, which are obtained following the methods described in the U.S. Pat. No. 2 940 944, and the German Pat. applications Nos. 1 060 596, 1 083 548 and 1 089 549.

Especially advantageous are the aminoplasts which are modified with alcohols, preferably alkanols of one – four carbon atoms. In place of these resinous products, it is possible to employ with equally good success precursors of aminoplasts, e.g., hexamethylol melamine, dimethylol urea, optionally in the etherified form, for example, hexamethoxymethyl melamine, hexabutoxymethyl melamine, dimethoxymethyl urea, dibutoxy-methyl urea, etc. Thus, a wide variety of commercially available aminoplasts can be used for combining with the special linear polyesters of the present invention. For more details regarding the aminoplasts which can be used, reference is made to "Organic Protective Coatings," Von Fischer and Bobaleck, 1953, Reinhold, pages 210 – 225; "Lackunstharze" by H. Wagner and H. F. Sarx, Carl Hanser Verlag, München, 4. edition, 1959, pages 60 – 74. Of course, it is also possible to use mixtures of all the above N-methylol products. In general then, any compound of the formula — NH—CH$_2$—O—R can be used wherein R represents hydrogen or alkyl of one – four carbon atoms, and the unsatisfied nitrogen valence is attached to an organic moiety capable of incorporation into a film and which does not interfere with the curing reaction.

The linear polyester generally has an acid number of 2 to 15, preferably 4 to 10 mg. KOH/g., and a hydroxyl number of 22 to 185, preferably 46 to 108 mg. KOH/g.

For producing the coatings, polyester and aminoplast are normally first dissolved in conventional varnish solvents, such as, for example, benzene, toluene, xylene, butanol, butyl acetate, ethyl glycol, ethyl glycol acetate, butyl glycol, methyl ethyl ketone, methyl isobutyl ketone, cyclohexanone or mixtures thereof. In this connection, the weight ratio of polyester : aminoplast can vary between 60 : 40 and 90 : 10 and the total amount of binder in the varnishes can vary within the usual limits, depending on the ultimate use of the varnish. The optimum ratios can readily be determined by a few routine tests; as a rule the total amount of binder in the varnishes will be between about 15 and 60 percent by weight.

The varnishes can contain the conventional additives and auxiliary substances, e.g., pigments, viscosity and flow modifiers, and other binders, such as epoxide resins, for example.

The thus-obtained varnish is then applied and baked at temperatures between 100° and 200° C. The cross-linking reactions taking place during this process are catalytically accelerated by acids. When employing polyesters having a very low acid number, it is thus possible to add acidic substances to the varnish. When adding, for example, 0.5 percent p-toluenesulfonic acid (based on the total amount of binder), the cross-linking reaction is highly accelerated. By adding even larger amounts of acid, it is also possible to produce coatings which dry at room temperature.

Also by reacting a polyester having a low acid content with about 1 – 5 percent of anhydride of a relatively strongly acidic dicarboxylic acid, e.g., maleic acid anhydride, the acid number of the polyester can be subsequently increased and, in this manner, the baking temperatures can be lowered also without the addition of strongly acidic substances.

The coatings prepared in accordance with the invention exhibit a variety of excellent properties. They have a high gloss, can be very readily pigmented, and show excellent resistance against yellowing. If the coatings are subjected to curing for 72 hours at 100° C., no visible yellowing can be observed. Even when cured at 150° C. for 72 hours, the coatings are still substantially, if not completely, resistant to yellowing. The coatings are also resistant to solvents, such as xylene, gasoline-benzene mixtures, esters and ketones, as well as being highly resistant to acids and alkalis. For example, in salt spraying tests, tropical tests and tests in the weatherometer, they prove to be superior corrosion-resistant and weather-resistant materials.

Moreover, the most noteworthy property of the coatings produced in accordance with this invention is their high elasticity combined with great hardness, which elasticity is preserved even when overbaked.

The elastic behavior of coatings is normally defined by conducting the Erichsen depression test (in accordance with DIN [German Industrial Standard] 53,156)) and stating, as a measure for the elasticity the depression of the coated sheet metal in mm. at which the varnish coating begins to crack. It is essential for this test procedure for deformation of the coating to be gradual (advance: 0.2 mm./sec.).

A definition for the behavior of coatings subjected to a sudden deformation is supplied by the so-called impact depression measurement. This measurement can be conducted, for example, with the impact depression apparatus 226/D of Erichsen, Hemer-Sundwig. In this apparatus, a hemisphere having a radius of 10 mm. is suddenly impressed into the sheet of metal (unvarnished side facing upward) by a falling weight of 8 kg. By varying the falling height of the weight, the depression can be varied. The depression value is stated (in mm.) at which the varnish coating beings to rupture. (The values indicated in the examples were obtained in this manner. In several examples, the value of > 5 is stated, since the apparatus described above does not make it possible to obtain a greater depression when using the deep-drawn metal sheets of 1 mm. in thickness employed for the test.)

As has been set forth in connection with the description of the state of the art, and as has been proven by comparative tests, coatings of linear polyesters and aminoplasts have been known which are elastic and also withstand impact stresses. However, these coatings exhibit very low hardness values (in accordance with DIN 53,157). On the other hand, coatings of great hardness are known which, however, are not elastic. In contrast thereto, the coatings obtained in accordance with the present invention exhibit high elasticity as well as high hardness.

This spectrum of properties opens up a wide field of applications for the coatings. In addition to being employed for varnishing individual parts subjected to high impact stress, the coatings are particularly well suited to the varnishing of materials which are subsequently deformed, e.g., by punching. The polyesters of this invention normally result in solutions of a comparatively low viscosity, e.g., 100 to 500 centipoises at room temperature. Therefore, varnishes having high solids contents can be utilized, thereby reducing labor costs, etc., for applying same.

Therefore, the coating compositions of this invention may be used for varnishing or enameling of e.g., automobile bodies, refrigerators, washing machines, etc., also they are suited for coil-coating. The coatings produced in accordance with this invention may be applied by different modes, e.g., spraying, dipping, brushing and wiping.

In U.S. Pat. No. 3,049,506, the production of low molecular weight polyesters of 1,4-bis-(hydroxymethyl)-cyclohexane and their use as a plasticizer for polyvinyl chloride are described. Aliphatic dicarboxylic acids are incorporated into these described polyesters (see the examples of the patent). The possibility is merely mentioned that aromatic, cycloaliphatic or heterocyclic dicarboxylic acids can also be employed in minor quantities (column 2, lines 10–21). Contrary thereto, in the coatings of the present invention, low molecular weight polyester of 1,4-bis-(hydroxymethyl)-cyclohexane and, if desired, of other diols, are employed which generally contain a predominant amount of aromatic and/or cycloaliphatic dicarboxylic acids. Thus, the special esters of this invention are not suggested by the specific previously described aliphatic polyesters of 1,4-bis-(hydroxymethyl)-chlorohexane, much less is the overall coating composition of this invention an obvious extension of said prior art.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

PREPARATION OF THE POLYESTER

A. 1,008 g. of 1,4-bis-(hydroxymethyl)-cyclohexane (7 mols), 62 g. of ethylene glycol (1 mol), 592 g. of phthalic acid anhydride (4 mols) and 438 g. adipic acid (3 mols) are heated together under a nitrogen atmosphere for 42 hours to 180° C., with the water being continuously removed. The thus-obtained polyester exhibits an acid number of 4.1 mg KOH/g., a hydroxyl number of 47.1 mg KOH/g. and an average molecular weight of 2,030.

Normally, the duration of the esterification process is selected so that the reaction is as compete as possible, i.e., until the acid number, in case of polyester charges of n mols of diol and (n−1) mols of dicarboxylic acid, is smaller than 5 mg. KOH/g. In case of batches of n mols of diol and (n+1) mols of dicarboxylic acid, the esterification is continued until the hydroxyl number is below 5 mg. KOH/g.

The esterification temperature is selected so that the losses of readily volatile substances remain low, i.e., at least during the first period of esterification, the reaction is conducted at a temperature below the boiling point of the substance having the lowest boiling temperature.

B. 1,728 g. of 1,4-bis-(hydroxymethyl)-cyclohexane (12 mols), 888 g. of phthalic acid anhydride (6 mols), 657 g. of adipic acid (4.5 mols) and 100 ml. of xylene are heated within one hour to 240° C. and maintained at this temperature for 5.5 hours, with the water being continuously removed. Thereafter, the entraining agent is distilled off with the aid of a vigorous stream of nitrogen. The thus-obtained polyester exhibits an acid number of 4.2 mg. KOH/g., a hydroxyl number of 59.6 mg. KOH/g. and an average molecular weight of 1,750.

C. 1,728 g. of 1,4-bis-(hydroxymethyl)-cyclohexane (12 mols), 888 g. of phthalic acid anhydride (6 mols) and 100 ml. of xylene are heated within 1 hour to 240° C. and maintained at this temperature for 4 hours, with the water being continuously removed. The acid number of the resultant product is 4.5 mg. KOH/g. After cooling to about 100° C. 400 g. of succinic acid anhydride (4 mols) is added, and the mixture is again heated to 240° C., and maintained at this temperature for 2 hours, the water being continuously removed. Thereafter, the entraining agent is distilled off with the aid of a vigorous nitrogen stream. The resultant polyester exhibits an acid number of 2.9 mg. KOH/g., a hydroxyl number of 77.5 mg. KOH/g., and an average molecular weight of 1,390.

INCREASING THE ACID NUMBER OF A POLYESTER

To a 60 percent xylene solution of a polyester having a low acid number, 1.2 percent maleic acid anhydride (based on the pure polyester) is added. After the added anhydride has been completely dissolved, the reaction solution is heated for 1 hour to 120° C., whereby the acid number of the polyester is increased by 8.56 mg. KOH/g.

The process for increasing the acid number of a polyester is normally conducted in a solution; however, there are no difficulties in carrying out the same reaction in the melt of the polyester under similar reaction conditions, as demonstrated by the following example.

136.2 g. of the polyester obtained in accordance with (B) is melted, mixed with 3.9 g. of maleic acid anhydride, and stirred for 1 hour at 130° C. The thusobtained polyester exhibits an acid number of 19.9 mg. KOH/g., a hydroxyl number of 43.2 mg. KOH/g., and an average molecular weight of 1,780.

PRODUCTION OF A VARNISH

The solutions of the thus-obtained polyesters in suitable solvents, normally in xylene, are mixed, in the desired solids ratio, with a commercially available 55 percent solution of a melamine-formaldehyde condensate in a xylene-butanol mixture (1 : 1) [Maprenal TTX produced by Cassella]. In order to obtain a polyester : melamine resin ratio of 7 : 3, 117 g. of a 60 percent solution of the polyesters are mixed with 54.5 g. of the above-mentioned melamine resin solution.

PRODUCTION OF AN ENAMEL

In order to prepare an enamel, a clear varnish is pigmented with $TiO_2$ in a ratio of binder : pigment of 2 : 1.

PRODUCTION AND TESTING OF THE COATINGS

For testing purposes, the clear varnish or the enamel is applied to metal test sheets and glass plates and baked. In order to lower the baking temperature, 0.5 percent p-toluenesulfonic acid (based on the total binder) is added to varnish solutions prepared with the use of polyesters having a low acid number. The coating thickness of the films subjected to the test amounts, in all examples, to 40 – 60$\mu$. The testing for hardness is conducted in accordance with DIN 53,157; the testing of the elasticity is carried out in accordance with the methods described above.

Examples 1–23 are compiled in the table. At the same time, the table contains the test values of the coatings produced from the polyesters dealt with in the following Comparative Examples 1–5.

COMPARATIVE EXAMPLE 1

1,580 g. of the symmetrical bis-(hydroxyethyl)-ether of bisphenol-A [ = p,p'-isopropylidenediphenol] (5 mols) is heated with 400 g. of succinic acid anhydride (4 mols) under a nitrogen purge stream for 6 hours to 180° C. Residual amounts of water of condensation are then removed by applying a vacuum of about 20 Torr [mm Hg]. The thus-produced polyester has an acid number of 5 mg. KOH/g.; this polyester is dissolved to form a 50 percent solution with a xylene-methyl ethyl ketone-cyclohexanone mixture (1 : 1 : 1).

COMPARATIVE EXAMPLE 2

(Example II from U.S. Pat. No. 2,460,186):

148 g. of phthalic acid anhydride, 146 g. of adipic acid, 278 g. of 2-ethylhexanediol-(1,3) and 110 ml. of xylene are heated within 4 hours to 180° C. and, within another 4 hours, to 200° C. (Although the U.S. Patent gives a ratio different by 100 to 1 for alcohol to acid, it is an obvious error.) The water formed during the reaction is removed via a water trap. Thereafter, the solvent is slowly removed by distillation within 4.5 hours, so that a final temperature of 240° C. is reached.

COMPARATIVE EXAMPLE 3

(Example IV from U.S. Pat. No. 2,460,186):

148 g. of phthalic acid anhydride, 202 g. of sebacic acid, 278 g. of 2-ethylhexanediol-(1,3), 28 g. of glycerin and 110 ml. of xylene are heated within 11.5 hours gradually to 230° C., the water formed during the reaction being removed via a water trap. Toward the end of the esterification, the solvent is slowly removed by distillation, and the reaction mixture maintained at 230° C. for 3 hours.

COMPARATIVE EXAMPLE 4

(Example 1 from Ullmans Encyklopädie der technischen Chemie [Ullmann's Encyclopedia of Technical Chemistry], 3rd Edition, Volume 14, page 87, Urban and Schwarzenberg, München-Berlin, 1963):

1,400 g. of adipic acid (9.6 mols) and 675 g. of ethylene glycol (10.9 mols) are gradually heated to 130°–140° C. with a nitrogen purge stream being passed thereover. In order to prevent any glycol from passing over when the reaction water is distilled off, part of the distillate is introduced into the column as reflux. During the course of several hours, the reaction mixture is heated to 200° C., then cooled to 150° C., and the condensation is continued under a vacuum until it is terminated at 200 Torr and 200° C. after 5–8 hours. The waxy polyester exhibits a hydroxyl number of 54 mg. KOH/g. and an average molecular weight of 2,000; this ester is dissolved in a xylene - methylethyl ketone mixture (1 : 1) to form a 50 percent solution.

COMPARATIVE EXAMPLE 5

(Example 2 from Ullmanns Encyklopädie der technischen Chemie, 3rd Edition, Volume 14, page 87, Urban and Schwarzenberg, München-Berlin, 1963):

316 g. of adipic acid (2.16 mols), 480 g.of phthalic acid anhydride (3.24 mols) and 374 g. of ethylene glycol (6.5 mols) are gradually heated to 160° – 200 ° C., under a nitrogen purge stream, until 11.8 g. of distillate has passed over. In this connection, care must be taken that the temperature at the heat of the column does not exceed 100 ° C. Thereafter, an additional 19 g. is distilled off under an increasing vacuum within 6 hours. The polyester has an acid number of 3 – 4 mg. KOH/g. and a hydroxyl number of 56 mg. KOH/g; this ester is dissolved in a xylene-methyl ethyl ketone - cyclohexanone mixture (1 : 1 : 1) to form a 50 percent solution.

| Example No. | Polyester of (mol) | Average molecular weight | Weight ratio polyester:melamine resin:TiO$_2$ | Catalyst | Baking conditions (° C./min.) | Hardness according to DIN 53,157 (sec.) | Deep drawability according to DIN 53,156 (mm.) | Impact depression (mm.) |
|---|---|---|---|---|---|---|---|---|
| 1 | 7 CHDM+ / 1 EG+ / 4 PSA+ / 3 ADS+ | 2,030 | 7:3:0 / 7:3:0 / 7:3:5 | — / 0.5% pTS+ / 0.5% pTS | 190°/30' / 130°/30' / 130°/30' | 191 / 196 / 158 | 9.2 / 9.1 / 8.3 | >5 / >5 / 4–5 |
| 2 | 4 CHDM / 1 EG / 2 PSA / 2 ADS | 1,080 | 7:3:0 / 7:3:5 | 0.5% pTS / 0.5% pTS | 130°/30' / 130°/30' | 187 / 168 | 6.8 / 5.9 | 3–4 / 2–3 |
| 3 | 7 CHDM / 1 PG+ / 4 PSA / 3 ADS | 1,950 | 7:3:0 / 7:3:0 / 7:3:5 / 7:3:5 | — / 0.5% pTS / 0.5% pTS / 1.2% MA+ | 190°/30' / 130°/30' / 130°/30' / 130°/30' | 194 / 204 / 181 / 166 | 9.3 / 8.9 / 6.3 / 7.2 | >5 / >5 / 3–4 / 4–5 |
| 4 | 6 CHDM / 2 PG / 4 PSA / 3 ADS | 1,955 | 7:3:0 / 7:3:5 / 7:3:0 / 7:3:5 | 0.5% pTS / 0.5% pTS / 1.2% MA / 1.2% MA | 130°/30' / 130°/30' / 130°/30' / 130°/30' | 134 / 128 / 141 / 130 | 8.5 / 7.2 / 8.8 / 8.1 | 4–5 / 3–4 / >5 / 4–5 |
| 5 | 5 CHDM / 1 PG / 4 PSA / 1 ADS | 1,395 | 7:3:0 / 7:3:0 / 8:2:0 | 0.5% pTS / 1.2% MA / 0.5% pTS | 130°/30' / 130°/30' / 130°/30' | 204 / 206 / 199 | 7.2 / 6.8 / 8.4 | 3–4 / 3–4 / 4–5 |
| 6 | 7 CHDM / 1 NPG+ / 4 PSA / 3 ADS | 1,885 | 7:3:0 / 7:3:5 | 0.5% pTS / 0.5% pTS | 130°/30' / 130°/30' | 194 / 179 | 8.2 / 6.4 | >5 / 3–4 |
| 7 | 6 CHDM / 2 NPG / 4 PSA / 3 ADS | 2,135 | 7:3:0 / 7:3:5 | 0.5% pTS / 0.5% pTS | 130°/30' / 130°/30' | 147 / 138 | 8.9 / 7.5 | >5 / 3–4 |
| 8 | 4 CHDM / 1 HD+ / 3 PSA / 1 ADS | 1,400 | 7:3:0 / 7:3:5 | 0.5% pTS / 0.5% pTS | 130°/30' / 130°/30' | 184 / 171 | 7.1 / 6.3 | 3–4 / 2–3 |
| 9 | 7 CHDM / 1 DG+ / 5 PSA / 2 ADS | 2,220 | 7:3:0 / 7:3:5 | 0.5% pTS / 0.5% pTS | 130°/30' / 130°/30' | 206 / 178 | >10 / 7.8 | >5 / 3–4 |
| 10 | 7 CHDM / 1 DG / 4 PSA / 3 ADS | 1,825 | 7:3:0 / 7:3:5 | 0.5% pTS / 1.2% MA | 130°/30' / 130°/30' | 128 / 141 | 9.8 / 7.2 | >5 / >5 |
| 11 | 5 CHDM / 1 DG / 4 PSA / 1 ADS | 1,345 | 7:3:0 / 7:3:5 | 0.5% pTS / 1.2% MA | 130°/30' / 130°/30' | 207 / 191 | 9.3 / 7.8 | 4–5 / 2–3 |
| 12 | 8 CHDM / 4 PSA / 3 ADS | 1,750 | 7:3:0 / 7:3:0 / 7:3:5 / 7:3:5 / 7:3:5 / 8:2:0 / 6:4:0 / 7:3:0 / 7:3:0 / 7:3:0 | — / 0.5% pTS / 0.5% pTS / 0.5% pTS / 0.5% pTS / 0.5% pTS / 0.5% pTS / 2.8% MA / 2.8% MA / 2.8% MA | 190°/30' / 130°/30' / 130°/30' / 160°/30' / 180°/30' / 130°/30' / 130°/30' / 130°/30' / 160°/30' / 190°/30' | 208 / 212 / 187 / 193 / 196 / 162 / 200 / 209 / 181 / 198 | 10.0 / 9.2 / 8.4 / 7.5 / 7.1 / 9.7 / 7.0 / 8.6 / 7.5 / 6.8 | >5 / >5 / >5 / >5 / >5 / >5 / 4–5 / >5 / >5 / >5 |
| 13 | 3 CHDM / 1 PSA / 1 ADS | 600 | 7:3:0 | 0.5% pTS | 130°/30' | 202 | 7.7 | 3 |
| 14 | 12 CHDM / 8 PSA / 3 ADS | 2,900 | 7:3:0 | 0.5% pTS | 130°/30' | 187 | 8.1 | >5 |
| 15 | 4 CHDM / 1 PSA / 2 BSA+ | 870 | 7:3:0 | 0.5% pTS | 130°/30' | 207 | 8.5 | 4 |
| 16 | 6 CHDM / 3 PSA / 2 BSA | 1,390 | 7:3:0 | 0.5% pTS | 130°/30' | 217 | 9.1 | >5 |
| 17 | 12 CHDM / 10 PSA / 1 BSA | 2,600 | 7:3:0 | 0.5% pTS | 130°/30' | 223 | 8.4 | 4–5 |
| 18 | 8 CHDM / 6 PSA / 1 DDCS+ | 1,850 | 7:3:0 | 0.5% pTS | 130°/30' | 227 | 10.0 | >5 |

| | Polyester of (mol) | Average molecular weight | Weight ratio polyester: melamine resin:TiO$_2$ | Catalyst | Baking conditions (° C./min.) | Hardness according to DIN 53,157 (sec.) | Deep drawability according to DIN 53,156 (mm.) | Impact depression (mm.) |
|---|---|---|---|---|---|---|---|---|
| 19 | 12 CHDM / 10 PSA / 1 FS | 2,690 | 7:3:0 | 0.5% pTS | 130°/30′ | 212 | 7.8 | 4 |
| 20 | 8 CHDM / 4 IPS+ / 3 ADS | 1,910 | 7:3:0 | 0.5% pTS | 130°/30′ | 205 | 10.0 | >5 |
| 21 | 8 CHDM / 4 HHPSA+ / 3 BSA | 1,640 | 7:3:0 | 0.5% pTS | 130°/30′ | 190 | 9.4 | >5 |
| 22 | 7 CHDM / 4 THPS+ / 2 BSA | 1,680 | 7:3:0 | 0.5% pTS | 130°/30′ | 185 | 8.8 | >5 |
| 23 | 6 CHDM / 4 HHTPS+ / 1 ADS | 2,090 | 7:3:0 | 0.5% pTS | 130°/30′ | 193 | 8.5 | >5 |
| Comparative example: | | | | | | | | |
| 1 | | | 7:3:0 | 0.5% pTS | 130°/30′ | 135 | 1.1 | <1 |
| 2 | | | 7:3:0 | 0.5% pTS | 130°/30′ | 35 | 2.0 | <1 |
| 3 | | | 7:3:0 | 0.5% pTS | 130°/30′ | 24 | 8.3 | >5 |
| 4 | | | 7:3:5 | 0.5% pTS | 130°/30′ | 46 | 6.1 | >5 |
| 5 | | | 7:3:5 | 0.5% pTS | 130°/30′ | 25 | 7.9 | >5 |

NOTE.—Abbreviations for table:
CHDM=1,4-bis-(hydroxymethyl)-cyclohexane.
EG=ethylene glycol.
PSA=phthalic acid anhydride.
ADS=adipic acid.
pTS=toluenesulfonic acid.
MA=maleic acid anhydride (the polyester which is low in acid is brought to a higher acid number by reaction with the indicated amount of maleic acid anhydride—based on the pure polyester—in accordance with the method described in the foregoing).
PG=1,2-propanediol.
NPG=2,2-dimethyl-1,3-propanediol, neopentyl glycol.
HD=1,6-hexanediol.
DG=diethylene glycol.
BSA=succinic acid anhydride.
DDCS=decanedicarboxylic acid.
FS=fumaric acid.
IPS=isophthalic acid.
HHPSA=hexahydrophthalic acid anhydride.
THPS=tetrahydrophthalic acid.
HHTPS=hexahydroterephthalic acid.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An uncured coating composition comprising:
   A. 40 – 10 percent by weight of a material selected from the group consisting of a polymer and oligomer of a compound of the formula —NH—CH$_2$—OR wherein R represents hydrogen or alkyl of one–four carbon atoms and the unsatisfied valence is an organic moiety capable of forming a film and not interfering with curing;
   B. 60 – 90 percent by weight of linear polyester having an average molecular weight of between 600 and 3,000, of:
   (I) an alcohol reactant comprising:
      1. 70 – 100 molar percent of 1,4-bis-(hydroxymethyl)-cyclohexane, and
      2. 30 – 0 molar percent of at least one member selected from the group consisting of aliphatic and cycloaliphatic diols wherein the hydroxyl functions are separated by two–eight carbon atoms, and wherein optionally up to two of the chain carbon atoms can be replaced by ether oxygen atoms, said oxygen atoms must be separated by at least 2 carbon atoms; and
   (II) an acid reactant comprising:
      1. 91 – 33 molar percent of at least one member selected from the group consisting of an aromatic and cycloaliphatic dicarboxylic acid and a functional acid esterifiable derivative thereof, and
      2. 9 – 67 molar percent of at least one component selected from the group consisting of an aliphatic dicarboxylic acid of four –12 carbon atoms and/or a functional acid esterifiable derivative thereof.

2. A coating composition according to claim 1 wherein said linear polyester has an average molecular weight of between 1,000 and 2,500.

3. A coating composition according to claim 1 wherein said component II(2) is a saturated aliphatic dicarboxylic acid of four–six carbon atoms or a functional acid esterifiable derivative thereof.

4. A coating composition according to claim 1 wherein said alcohol reactant is 1,4-bis(hydroxymethyl)-cyclohexane (component I(1).

5. A coating composition according to claim 1 wherein said material (A) is selected from the group consisting of a melamine-formaldehyde condensate, a urea-formaldehyde condensate, and N,N′-ethyleneurea-formaldehyde condensate, a dicyanodiamide-formaldehyde condensate, and a benzoguanamine-formaldehyde condensate.

6. A coating composition according to claim 1 wherein said acid reactant II. comprises 75 – 50 molar percent of II(1) and 25 – 50 molar percent of II(2).

7. A cured coating produced from the coating composition of claim 2.

8. A cured coating produced from the coating composition of claim 5.

9. An article of manufacture comprising a substrate having superimposed thereon a substantially uniform layer of a cured coating according to claim 7.

10. An article of manufacture comprising a substrate having superimposed thereon a substantially uniform layer of a cured coating according to claim 8.

11. A coating composition as defined by claim 1, further comprising varnish solvent means.

12. A cured coating produced from the coating composition of claim 1.

13. An article of manufacture comprising a substrate having superimposed thereon a substantially uniform layer of a cured coating according to claim 12.

* * * * *